N. D. LEVIN.
CONNECTING DEVICE FOR ELECTRIC CONDUCTORS.
APPLICATION FILED MAR. 11, 1910.
1,082,032.
Patented Dec. 23, 1913.
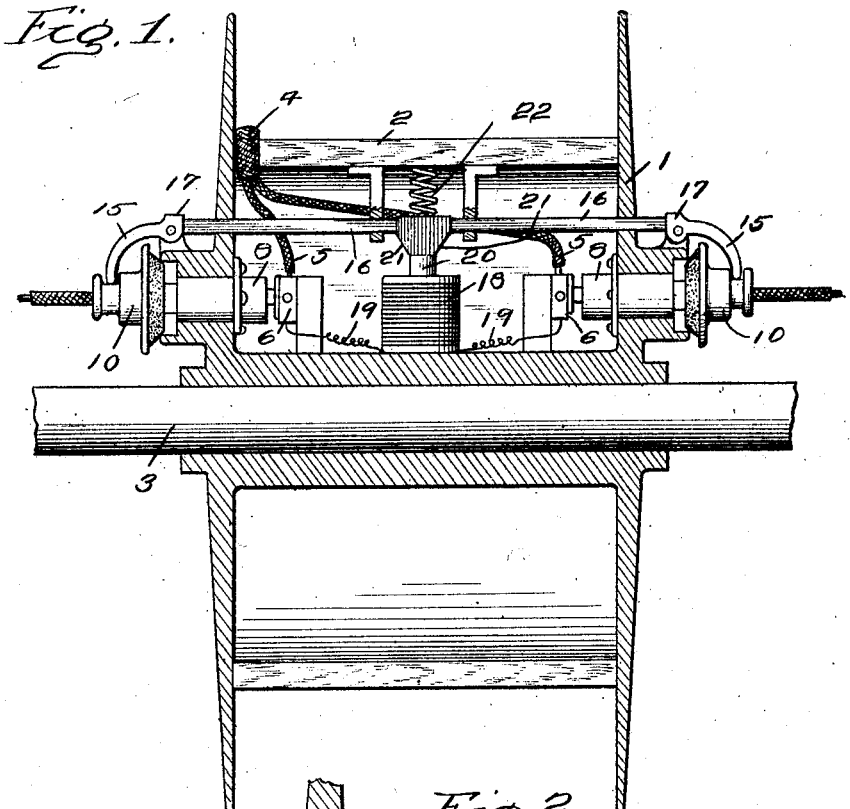
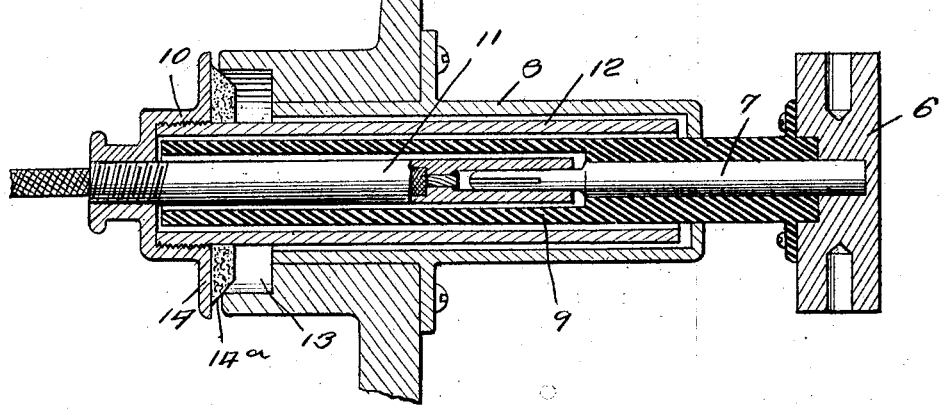
Witnesses
Inventor
Nils D. Levin
By H. H. Bliss Attorney

UNITED STATES PATENT OFFICE.

NILS D. LEVIN, OF COLUMBUS, OHIO, ASSIGNOR TO THE JEFFREY MANUFACTURING COMPANY, A CORPORATION OF OHIO.

CONNECTING DEVICE FOR ELECTRIC CONDUCTORS.

1,082,032.  Specification of Letters Patent.  Patented Dec. 23, 1913.

Application filed March 11, 1910. Serial No. 548,664.

*To all whom it may concern:*

Be it known that I, NILS D. LEVIN, a citizen of the United States, residing at Columbus, in the county of Franklin and State of Ohio, have invented certain new and useful Improvements in Connecting Devices for Electric Conductors, of which the following is a specification, reference being had therein to the accompanying drawing.

This invention relates to improvements in connecting devices for electric conductors and is especially adapted for use in mines or other similar places where gases of an explosive nature are frequently met with.

For purposes of illustration I have shown in the accompanying drawings a device embodying my invention applied to a cable reel such as is commonly used in connection with mining machines. It will be understood, however, that my invention is not limited to a cable reel but may be used in connection with a variety of different types of apparatus.

A cable reel such as I have illustrated is ordinarily mounted either directly upon the mining machine or upon a separate truck which is adapted to be placed at a point near the mining machine. In either case it is desirable to provide conductors for connecting the motor of the mining machine with the cable reel, and these conductors should preferably be detachable from the cable reel to permit its turning to wind or unwind the cable. In practice, after the mining machine and the reel have been placed in position, enough cable is unwound from the reel to connect with the mains in the mine entry. After this has been done the conductors to the motor are connected, and the motor is ready for operation. It is essential that these conductors be not connected or disconnected when the electrical circuit is otherwise complete as in this case an arc might result which would cause a disastrous explosion. It is to obviate this difficulty that my present invention is intended.

Of the drawings: Figure 1 is a cross sectional view of a cable reel having a device embodying my invention. Fig. 2 is an enlarged cross sectional view of one of the plugs in place in one of the sockets.

Referring to the drawings, 1 represents the cable reel as a whole. The reel comprises the cable drum 2, which is rotatably mounted by means of the shaft 3.

4 represents the cable which is to be wound on the drum. This cable preferably comprises two separate conductors 5, 5, suitably bound together. Each of the conductors 5 is connected by means of a block 6 to a terminal 7 located within the socket or casing 8. Surrounding each terminal and located within the socket or casing 8 is a sleeve 9 preferably formed of insulating material.

10 represents a conductor terminal plug provided with a finger 11, adapted to enter the sleeve 9 and engage the terminal 7. Surrounding the finger 11 and concentric with it is a sleeve 12 adapted to enter the space between the sleeve 9 and the socket 8. The inside and outside diameters of the parts 11, 9, 12 and 8 are so related to each other that there is a slight clearance between each two adjacent surfaces and a continuous tortuous passage-way is established between the space immediately surrounding the terminal 7 and the space 13 provided at the outer end of the socket 12. The plug 10 is provided with a radial flange 14 to which is attached a pad 14$^a$ formed of soft rubber or other suitable material adapted to close the chamber 13.

15, 15 are hooks or catches adapted to engage the outer ends of the plugs 10. These hooks are pivotally mounted on the frame of the reel.

16, 16 are rods adapted to slide relatively to the reel frame. At their outer ends they are adapted to engage with suitable shoulders 17, 17, formed on the hooks 15, 15.

18 is a solenoid mounted upon the reel frame and electrically connected by means of the wires 19 to the conductors 5. It will be observed that current must always flow around the solenoid when the cables 5, 5, are connected to a source of electric energy.

20 is a core adapted to enter the solenoid. At its outer end the core is provided with beveled surfaces 21. A spring 22 connects with the core and tends to hold it in its outer position. When the core 20 is moved to its inner position under the influence of the solenoid, the beveled surfaces 21 engage the inner ends of the rods 16 and force the rods outward. This outward movement of the rods forces the hooks 15 into engagement with the plugs 10. So long as the current continues to flow through the solenoid the parts are all held in the position shown in Fig. 1, and the plugs cannot be removed. The plugs can be removed only when electrical connections to the cable 4 are broken at the mine entry. It will furthermore be noted that should the cable 4 be connected before the plugs are inserted the hooks 15 would engage the pads 14ª to prevent the insertion of the plugs far enough to engage the terminals 7. It will be observed that the solenoid 18 and the core 20 are entirely inclosed within the drum 2 of the reel and that therefore these parts cannot be disturbed by any one desiring to improperly connect the conductors. As an additional precaution I have provided the concentric sleeves about the engaging parts of the terminals 7 and the plugs 10. If, on account of any possible defect in the mechanism which I have described, one of the plugs 10 were removed when current was flowing, it would still be impossible for any harm to result from the arc which might be thus caused. If an explosion were to occur within the sleeve 9, it would be impossible for this explosion to ignite the external atmosphere. On account of the long tortuous passageway any gases passing out would be cooled to a temperature considerably below that of ignition. Furthermore the pad 14ª serves to keep explosive gases from entering and accumulating in the spaces within and surrounding the sleeves.

What I claim is—

1. In a mechanism of the class described, the combination of two elements adapted to be maintained at different electrical potentials, terminals connected one to each element, conductor plugs adapted to each engage a terminal, and automatic means for locking the plugs in engagement with the terminals when the elements are at different potentials, the operation of the said means being dependent upon the difference in potential of the two said elements, substantially as set forth.

2. In a mechanism of the class described, the combination of a plurality of elements adapted to be maintained at different electrical potentials, terminals connected one to each element, conductor plugs adapted to each engage a terminal, and automatic means for preventing the engagement or disengagement of the plugs and the terminals, the operation of the said means being dependent upon the difference in potential of one of the said elements from another, substantially as set forth.

3. In a mechanism of the class described, the combination of two elements adapted to be maintained at different electrical potentials, an electro-magnetic device electrically connected between the said two elements to receive its energizing current from them, a terminal connected to one of the elements, a conductor plug adapted to engage the terminal, and means automatically controlled by the electro-magnetic device for locking the plug in engagement with the terminal when the two elements are at different potentials, substantially as set forth.

4. In a mechanism of the class described, the combination of two elements adapted to be maintained at different electrical potentials, an electro-magnetic device electrically connected to the said elements, a terminal connected to one of them, a conductor plug adapted to engage the terminal, and means controlled by the electromagnetic device for preventing the engagement or disengagement of the plug with the terminal when the two elements are at different potentials, substantially as set forth.

5. In a mechanism of the class described, the combination of two contacts adapted to engage each other, an element adapted to be maintained at a different electrical potential from one of them, and automatic means for preventing the engagement or disengagement of the contacts, the operation of the said means being dependent upon the difference in potential of the said element from the said contact, substantially as set forth.

6. In a mechanism of the class described, the combination of a fixed contact, a movable contact adapted to engage the fixed contact, an element adapted to be maintained at a different electrical potential from the fixed contact, a solenoid electrically connected between the fixed contact and the said element, a spring controlled core adapted to be drawn into the solenoid when it is energized by the current resulting from the potential difference between the fixed contact and the element, and devices operably connected with the core for locking the movable contact in or out of engagement with the fixed contact, substantially as set forth.

7. In a mechanism of the class described, the combination of a fixed contact, a movable contact adapted to engage the fixed contact, an element adapted to be maintained at a different electrical potential from the fixed contact, an electro-magnetic connection between the fixed contact and the said element, the said device having a spring controlled member adapted to be moved in one direction electro-magnetically and in the other direction by the action of the spring, a holding device adapted to hold the movable contact in or out of engagement with the fixed contact, and means between the electromagnetic device and the holding device for locking the said holding device in operative potential difference between the fixed contact and the element, substantially as set forth.

8. In a mechanism of the class described, the combination of a fixed contact, a movable contact adapted to engage the fixed contact, an element adapted to be maintained at a different electrical potential from the fixed contact, a means for holding the movable contact in engagement with the fixed contact, a movable member having a beveled surface, a device adapted to be engaged by the beveled surface to move the holding means into operative position when the movable member moves in one direction, the said device being released when the movable member moves in the other direction, and electro-magnetic means for controlling the movable member, the said electro-magnetic means being connected between the fixed contact and the said element and adapted to actuate the movable member in a direction to move the holding means into operative position when the fixed contact and the said element are at different potentials, substantially as set forth.

9. In a device of the class described, the combination of a fixed cylindrical socket closed at one end, a fixed hollow cylinder concentric within the socket and closed at the same end as the socket, a conductor terminal within the said cylinder adjacent its closed end, a movable hollow cylinder closed at one end, the other end being adapted to enter the space between the fixed socket and the fixed cylinder with clearance at all points, a conductor terminal finger concentric within the movable cylinder and adapted to enter the fixed cylinder with clearance at all points and to engage the terminal therein, and a pad of yielding material between the fixed socket and the movable cylinder for forming a tight joint between them when the parts are in operative positions, substantially as set forth.

In testimony whereof I affix my signature, in presence of two witnesses.

NILS D. LEVIN.

Witnesses:
R. R. DUNLOP,
H. B. ALEXANDER.